United States Patent
Kang et al.

(10) Patent No.: US 11,772,530 B2
(45) Date of Patent: Oct. 3, 2023

(54) VEHICLE SEAT FOR MOUNTING CHILD SEAT

(71) Applicants: Hyundai Motor Company, Seoul (KR); Kia Corporation, Seoul (KR)

(72) Inventors: Seungkyu Kang, Hwaseong-si (KR); Sung Ung Ryu, Seoul (KR); Jaedeok Byeon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/747,792

(22) Filed: May 18, 2022

(65) Prior Publication Data
US 2023/0001831 A1    Jan. 5, 2023

(30) Foreign Application Priority Data
Jun. 30, 2021   (KR) .................. 10-2021-0085679

(51) Int. Cl.
 *B60N 2/28*   (2006.01)
(52) U.S. Cl.
 CPC ......... *B60N 2/2869* (2013.01); *B60N 2/2827* (2013.01)

(58) Field of Classification Search
CPC .. B60N 2/2821; B60N 2/2869; B60N 2/2806; B60N 2/2809
USPC ...................................... 297/256.12, 344.21
See application file for complete search history.

(56) References Cited

U.S. PATENT DOCUMENTS

| 7,997,647 | B2 * | 8/2011 | Sjoquist | B60N 2/3081 |
| | | | | 297/238 |
| 9,969,304 | B2 * | 5/2018 | Johnson | B60N 2/2869 |
| 10,351,026 | B1 * | 7/2019 | Berndtson | A47C 1/08 |
| 11,584,267 | B2 * | 2/2023 | Longenecker | B60N 2/2872 |
| 2008/0164712 | A1 * | 7/2008 | Burkey | B60R 7/043 |
| | | | | 296/65.09 |
| 2020/0215941 | A1 | 7/2020 | Resch et al. | |

FOREIGN PATENT DOCUMENTS

KR   10-2020-0083451 A   7/2020

\* cited by examiner

*Primary Examiner* — Sarah B McPartlin
(74) *Attorney, Agent, or Firm* — MORGAN, LEWIS & BOCKIUS LLP

(57) ABSTRACT

A vehicle seat for mounting a child seat rotatably provided in a vehicle body, includes a backrest frame; a seat back panel coupled to the backrest frame; and a rotation anchorage which is provided in the seat back panel and is rotatably provided with an anchorage member to which a top tether of the child seat is fastened as the vehicle seat rotates.

15 Claims, 21 Drawing Sheets

(Front side)

(Rear side)

(Front side)

(Rear side)

(Front side)

(Rear side)

(Front side)

(Rear side)

(Front side)

(Rear side)

VEHICLE SEAT FOR MOUNTING CHILD SEAT

CROSS-REFERENCE TO RELATED APPLICATION

The present application claims priority to Korean Patent Application No. 10-2021-0085679 filed on Jun. 30, 2021, the entire contents of which is incorporated herein for all purposes by this reference.

BACKGROUND OF THE PRESENT DISCLOSURE

Field of the Present Disclosure

The present disclosure relates to a vehicle seat for mounting a child seat, and more particularly, to a vehicle seat for mounting a child seat which may be mounted on a rotatable vehicle seat without a belt of the child seat being twisted.

DESCRIPTION OF RELATED ART

When infants or children are in a vehicle, child seats are used to keep them safe.

The child seat provided in the vehicle may be classified into a forward-facing child seat which is provided to face the front of the vehicle, and a rearward-facing child seat which is provided to face the rear of the vehicle.

The child seat may be manufactured based on a standard of the international standard organization FIX (ISOFIX), and may be fixed by fastening an ISOFIX connector to an anchor member.

However, recently, a vehicle seat provided in the vehicle does not face the front or rear of the vehicle, but a swivel vehicle seat that rotates so that a side of the vehicle seat faces the front or rear of the vehicle is being developed.

When a child seat is provided in such a swivel vehicle seat, the following problems may occur.

When the swivel vehicle seat faces the front of the vehicle, a child seat belt is fixed to an anchor member of the swivel vehicle seat as in the related art.

However, when the swivel vehicle seat rotates and then a side of the swivel vehicle seat faces the front of the vehicle, the belt (or top tether) of the child seat may be twisted, and accordingly, the child seat may not be stably provided on a swivel vehicle seat 100.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle seat for mounting a child seat which may stably install a child seat on a swivel vehicle seat which is rotatably provided with respect to a driving direction of a vehicle.

Various aspects of the present disclosure are directed to providing a vehicle seat for mounting a child seat which is rotatably provided in a vehicle body, including: a backrest frame; a seat back panel coupled to the backrest frame; and a rotation anchorage which is provided in the seat back panel and is rotatably provided with an anchorage member to which a top tether of the child seat is fastened as the vehicle seat rotates.

The rotation anchorage may include: a mounting block mounted on the seat back panel; a rotating block which is rotatably provided on the mounting block and in which the anchorage member to which the top tether of the child seat is coupled is formed; a tensioner that provides an elastic force to the rotating block; and a piston device supporting the rotating block so that the rotating block is selectively rotated.

The tensioner may include an elastic member provided in the mounting block and providing an elastic force for rotation of the rotating block.

The tensioner may further include a head coupled to the elastic member and selectively contacting with the rotating block.

An end portion of the head may be formed to have a hemisphere shape.

The piston device may include: a piston rack which is movably provided in the mounting block in a predetermined direction, selectively supports a side surface of the rotation block, and is configured to reciprocate in a predetermined distance; a driving portion that is engaged to the piston rack and configured to provide power to move the piston rack in the predetermined distance; and a power transmitting device that couples the driving portion to the piston rack and transmits the power of the driving portion to the piston rack.

The power transmitting device may include: a worm gear connected to the driving portion; a pinion gear gear-engaged to the worm gear; and a rack gear formed in the piston rack and gear-engaged to the pinion gear.

The vehicle seat for mounting the child seat may further include a block cover fastened to the mounting block to prevent the piston device and the tensioner from being separated from the mounting block.

The vehicle seat for mounting the child seat may further include a limiting device that limits a moving distance of the piston rack.

The limiting device may include: a slit formed in the piston rack; and a stopper pin formed in the block cover and slidably inserted into the slit.

The slit may be formed along a moving direction of the piston rack.

The piston rack may be provided in the mounting block to be movable in an unlocked direction to allow rotation of the rotating block and in a locked direction to limit rotation of the rotating block.

When the piston rack moves up to an unlocked completion position in the unlocked direction, the rotating block may rotate in a first direction by the tensioner, and when the piston rack moves in the locked direction at the unlocked completion position, the rotating block may rotate in a second direction by the piston rack.

The rotating block may be formed to have a polygonal block, and may rotate at intervals of 90 degrees according to reciprocating movement of the piston rack.

A block seating groove in which the rotating block is rotatably accommodated and a tensioner seating groove in which the tensioner is movably accommodated may be formed on a first surface of the mounting block, and a rack seating groove in which the piston rack is movably accommodated and a pinion seating groove in which the worm gear is rotatably accommodated may be formed on a second surface of the mounting block.

A driving portion supporting groove into which a locking protrusion of the driving portion is inserted may be formed on a side surface of the mounting block.

According to the vehicle seat for mounting the child seat according to the exemplary embodiment of the present disclosure as described above, when a vehicle seat rotates according to a driving direction of a vehicle, a rotation anchorage for mounting a child seat rotates, so that it is possible to prevent a belt of the child seat from being twisted, stably installing the child seat on the vehicle seat.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
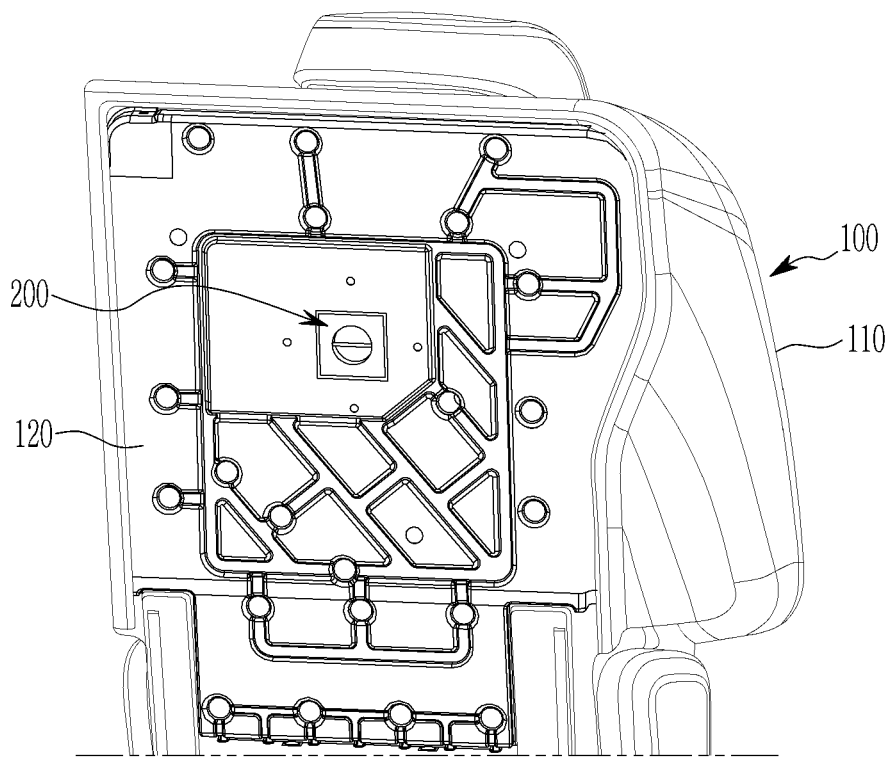
FIG. 1 illustrates a perspective view of a vehicle seat according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

To clearly describe the present disclosure, parts that are irrelevant to the description are omitted, and identical or similar constituent elements throughout the specification are denoted by the same reference numerals.

Furthermore, because the size and thickness of each configuration shown in the drawings are arbitrarily shown for convenience of description, the present disclosure is not necessarily limited to configurations illustrated in the drawings, and to clearly illustrate several parts and areas, enlarged thicknesses are shown.

Hereinafter, a vehicle seat for mounting a child seat according to various exemplary embodiments of the present disclosure will be described in detail with reference to the accompanying drawings.

Figure 2:
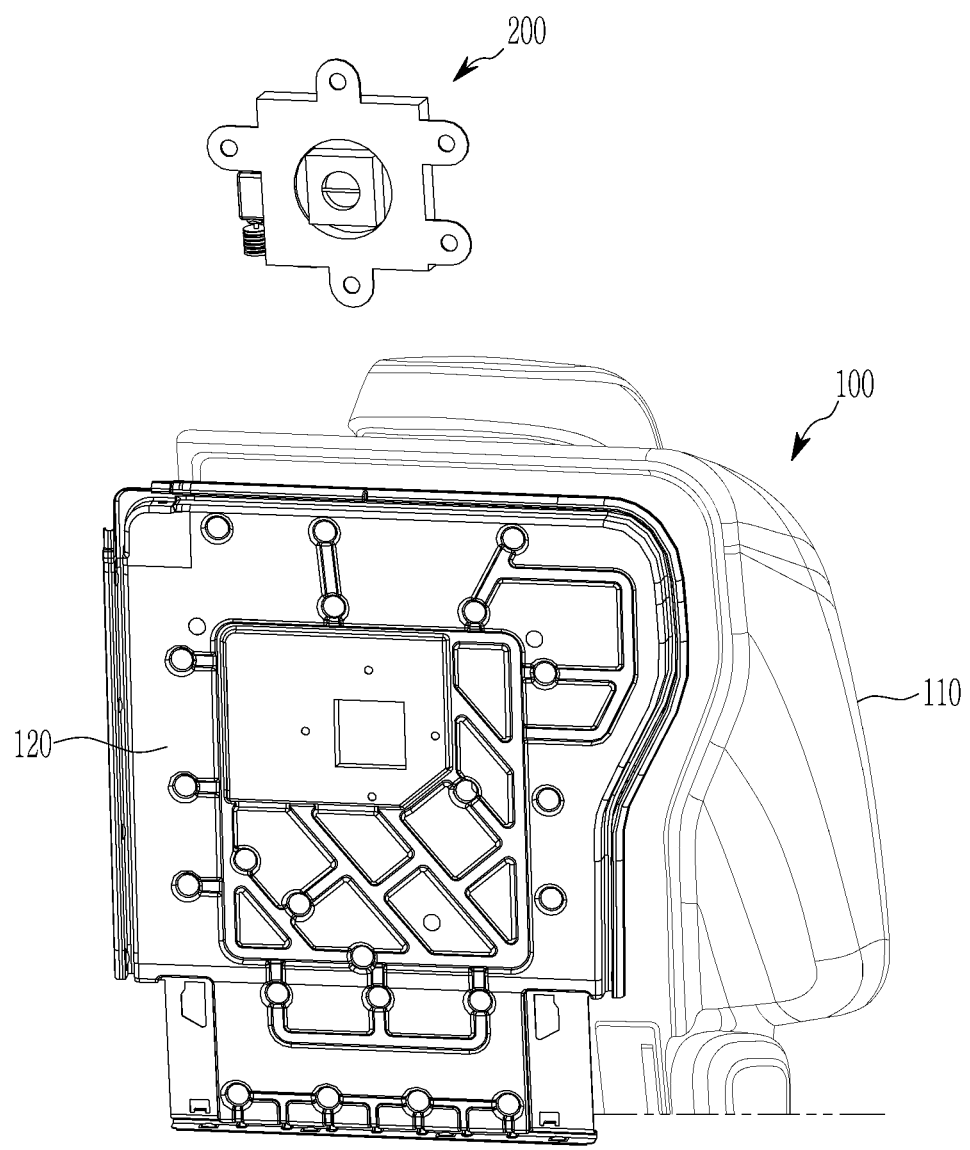
FIG. 2 illustrates an exploded perspective view of a vehicle seat according to various exemplary embodiments of the present disclosure.

FIG. 1 illustrates a perspective view of a vehicle seat according to various exemplary embodiments of the present disclosure. FIG. 2 illustrates an exploded perspective view of a vehicle seat according to various exemplary embodiments of the present disclosure.

As shown in FIG. 1 and FIG. 2, a vehicle seat 100 for mounting a child seat according to various exemplary embodiments of the present disclosure may include a backrest frame 110 which is rotatably mounted on a vehicle body and supports a back of a passenger, a seat back panel 120 coupled to the backrest frame 110, and a rotation anchorage 200 provided in the seat back panel 120.

The rotation anchorage 200 is rotatably provided with an anchor member 221 to which a top tether 130 of the child seat is fastened.

Figure 3:
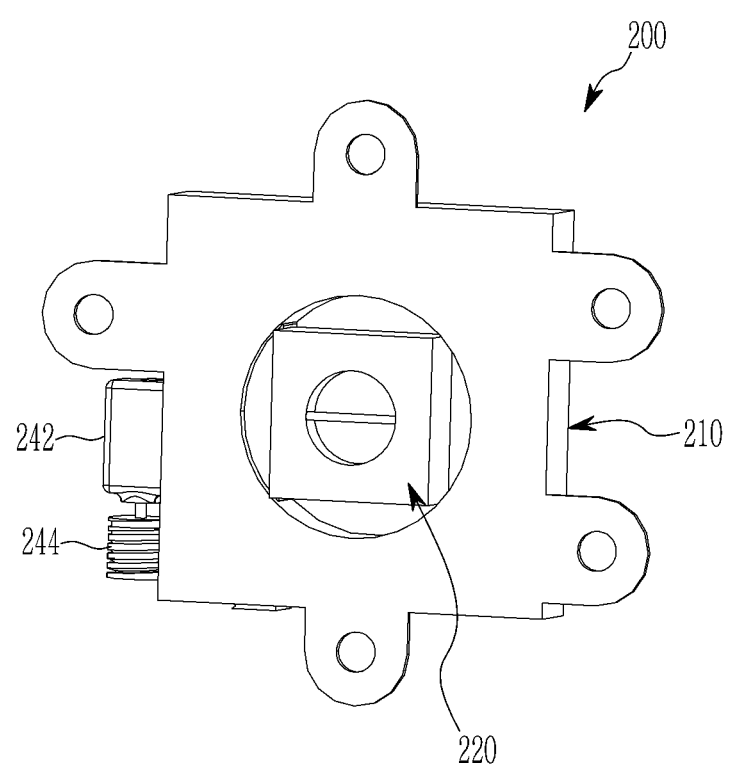
FIG. 3 illustrates a perspective view of a rotation anchorage according to various exemplary embodiments of the present disclosure.
Figure 4:
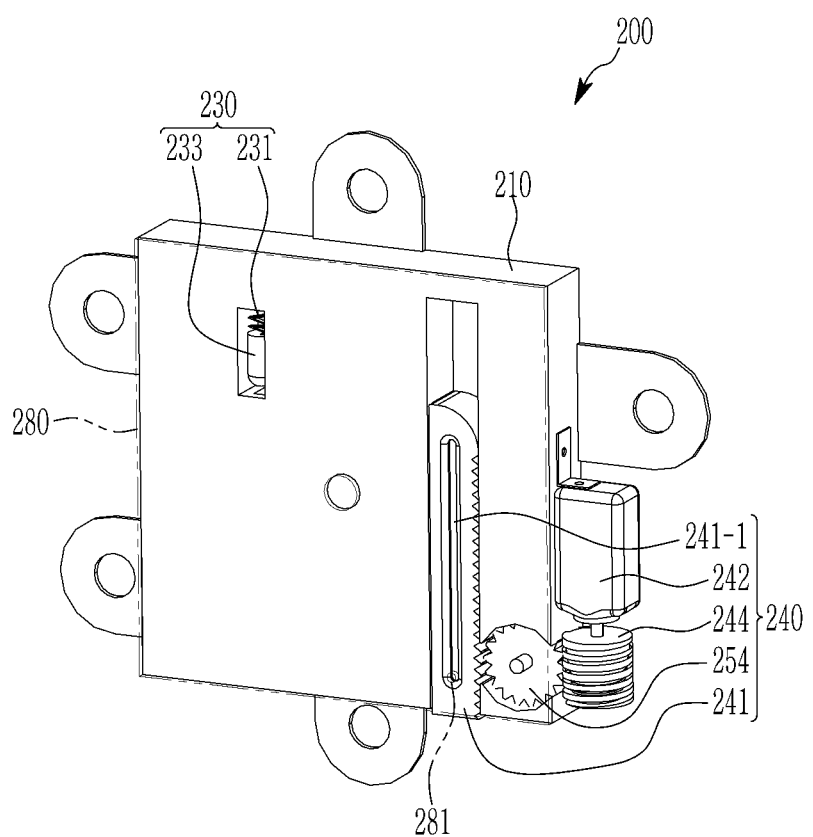
FIG. 4 illustrates a perspective view of a rotation anchorage in another direction according to various exemplary embodiments of the present disclosure.
Figure 5:
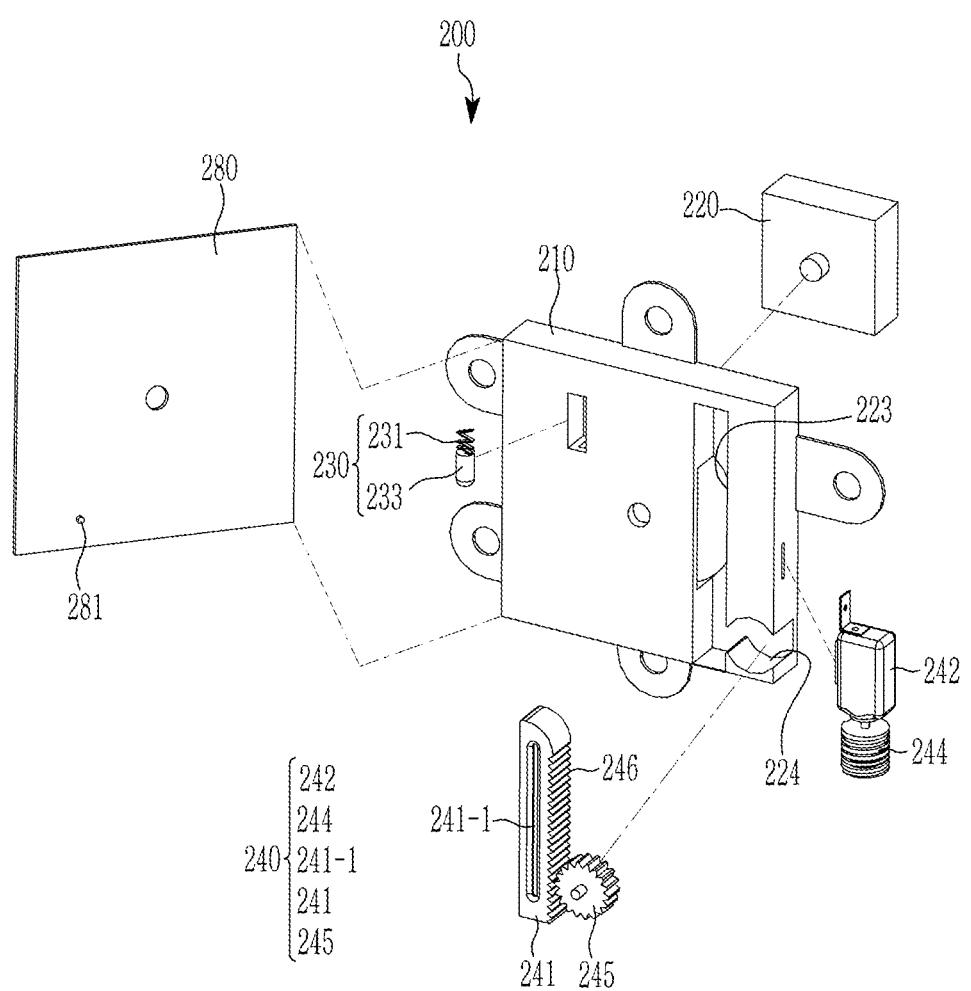
FIG. 5 illustrates an exploded perspective view of a rotation anchorage according to various exemplary embodiments of the present disclosure.

FIG. 3 illustrates a perspective view of a rotation anchorage according to various exemplary embodiments of the present disclosure. FIG. 4 illustrates a perspective view of a rotation anchorage in another direction according to various exemplary embodiments of the present disclosure. FIG. 5 illustrates an exploded perspective view of a rotation anchorage according to various exemplary embodiments of the present disclosure.

As shown in FIG. 3 to FIG. 5, the rotation anchorage 200 may include a mounting block 210 mounted on the seat back panel 120, a rotating block 220 which is rotatably provided on the mounting block 210 and in which the anchor member 221 to which the top tether 130 of the child seat is fastened is formed, a tensioner 230 that provides an elastic force to the rotating block 220, and a piston device 240 supporting the rotating block 220 so that the rotating block 220 selectively rotates.

The rotating block 220 may be formed as a polygonal block, for example, as a quadrangular block. The rotating block 220 may be accommodated in a block seating groove 211 formed on one surface of the mounting block 210 (for example, a surface facing an opposite side of the seat back panel 120). The block seating groove 211 may be formed to have a shape of a circle. An anchor member 221 to which the top tether 130 is fastened is formed on a surface of the rotating block 220 facing the seat back panel 120. The rotating block 220 may rotate at intervals of 90 degrees according to reciprocating movement of a piston rack of the piston device 240.

Figure 6:
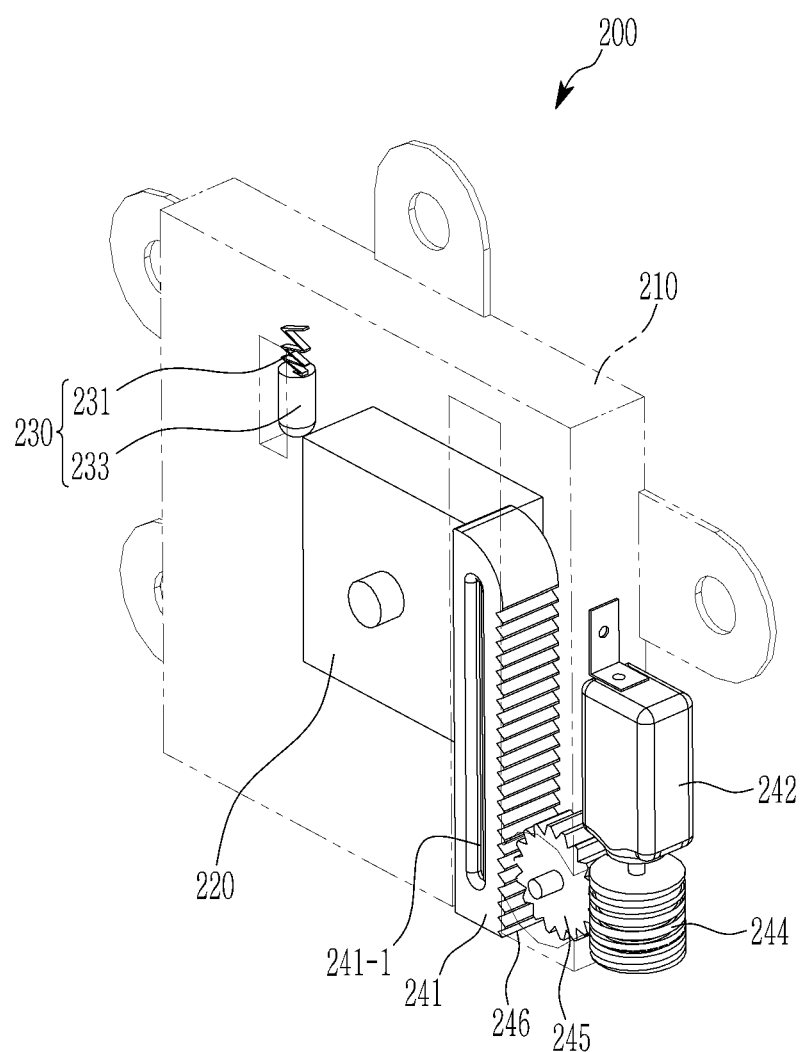
FIG. 6 illustrates a perspective view of a portion of a rotation anchorage according to various exemplary embodiments of the present disclosure.
Figure 7:
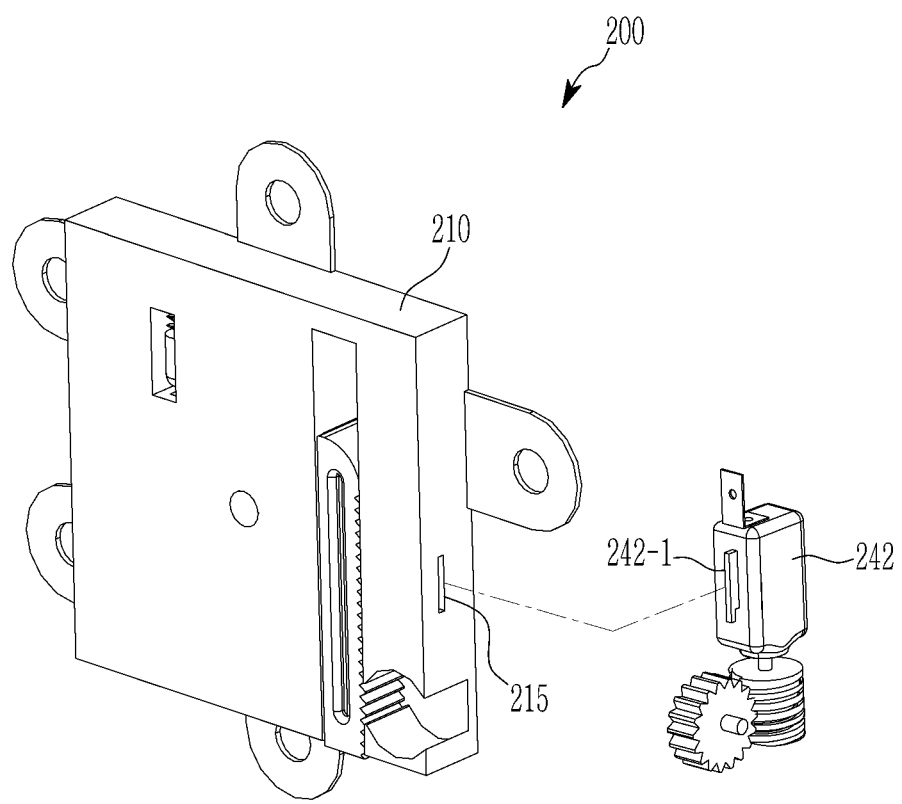
FIG. 7 illustrates an exploded perspective view of a portion of a rotation anchorage according to various exemplary embodiments of the present disclosure.

FIG. 6 illustrates a perspective view of a portion of a rotation anchorage according to various exemplary embodiments of the present disclosure. FIG. 7 illustrates an exploded perspective view of a portion of a rotation anchorage according to various exemplary embodiments of the present disclosure.

Referring to FIG. 6 and FIG. 7, the piston device 240 may include a piston rack 241, a driving portion 242, and a power transmitting device.

The piston rack 241 is provided to be movable in a direction (for example, a vertical direction) set in the mounting block 210, selectively supports a side surface of the rotating block 220, and reciprocates a set distance. The piston rack 241 may be provided in the mounting block 210 to be movable in an unlocking direction (for example, a downward direction) allowing rotation of the rotating block 220 and in a locking direction (for example, an upward direction) limiting rotation of the rotating block 220.

The driving portion 242 provides power to move the piston rack 241, and may be implemented through an electric motor. The driving portion 242 may include a driving portion body in which a motor configured for generating power is embedded, a driving portion bracket formed in the driving portion body, a driving portion locking protrusion formed in the driving portion body, and a driveshaft.

The power transmitting device transmits power generated by the driving portion 242 to the piston rack 241. To the present end, the power transmitting device may include a worm gear 244 provided in the driving portion 242, a pinion gear 245 geared with the worm gear 244, and a rack gear 246 formed in the piston rack 241 and geared with the pinion gear 245.

Referring back to FIG. 3 to FIG. 5, the tensioner 230 may include an elastic member 231 and a head 233.

The elastic member 231 and the head 233 are accommodated in a tensioner seating groove 212 of the mounting block 210, and the elastic member 231 provides an elastic force for rotation of the rotating block 220. In the exemplary embodiment of the present disclosure, the elastic member 231 may be implemented as a compression coil spring. The head 233 may selectively contact with the rotating block 220, and may be coupled to the elastic member 231. That is, the elastic member 231 may provide an elastic force to the rotating block 220 through the head 233.

The head 233 may be formed to have a substantially cylindrical shape, and an end portion thereof selectively contacting with the rotating block 220 may be formed to have a hemisphere shape.

A block cover 280 is fastened to the mounting block 210 at an opposite side to the seat back panel 120. The block cover 280 is formed in a plate shape corresponding to the mounting block 210, and prevents separation of the piston rack 241, the pinion gear 245, and the tensioner 230 of the piston device 240 which is fastened to the mounting block 210.

The vehicle seat 100 for mounting the child seat according to the exemplary embodiment of the present disclosure may further include a limiting device for limiting a moving distance of the piston rack 241.

The limiting device may include a slit 241-1 formed in the piston rack 241, and a stopper pin 281 formed in the block cover 280. The slit 241-1 is formed along a moving direction (for example, a vertical direction) of the piston rack 241, and the stopper pin 281 is slidably inserted into the slit 241-1. Accordingly, when the piston rack 241 moves downward, the stopper pin 281 contacts with an end portion (for example, an upper end portion) of the slit 241-1, and thus the moving distance thereof is limited.

Figure 8:
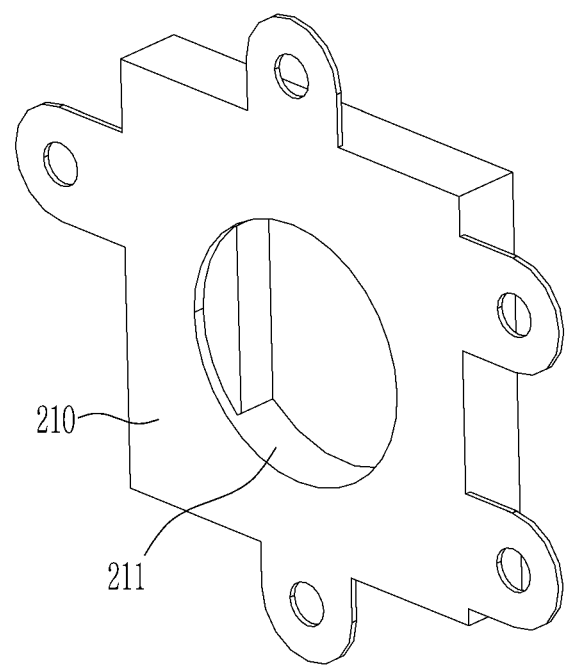
FIG. 8 illustrates a perspective view of a mounting block according to various exemplary embodiments of the present disclosure.
Figure 9:
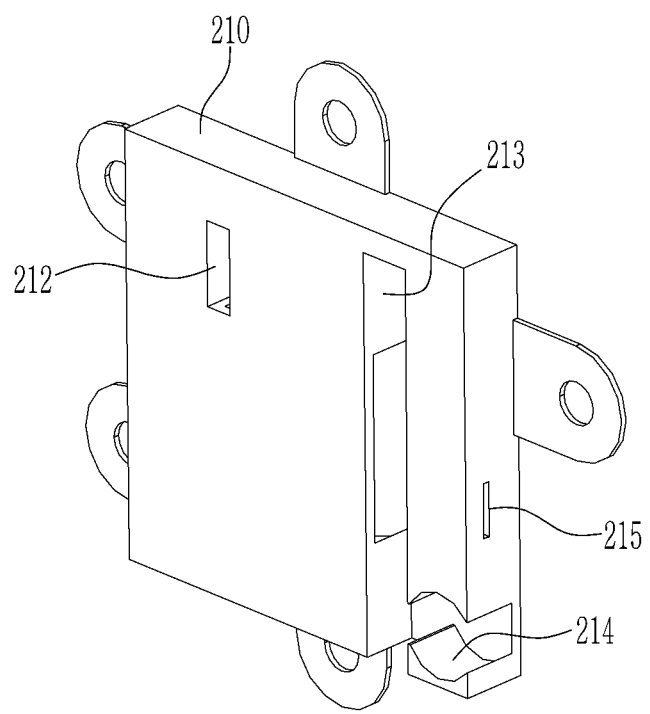
FIG. 9 illustrates a perspective view of a mounting block in another direction according to various exemplary embodiments of the present disclosure.

FIG. 8 illustrates a perspective view of a mounting block according to various exemplary embodiments of the present disclosure. FIG. 9 illustrates a perspective view of a mounting block in another direction according to various exemplary embodiments of the present disclosure.

As shown in FIG. 8 and FIG. 9, the mounting block 210 is formed to have a substantially quadrangular block shape, and a plurality of panel brackets for mounting on the seat back panel 120 are formed at the outside thereof.

The block seating groove 211 in which the rotating block 220 is rotatably accommodated and the tensioner seating groove 212 in which the tensioner 230 is movably accommodated are formed on one surface of the mounting block 210.

On the other surface of the mounting block 210 (for example, a surface thereof facing the seat back panel 120), a rack seating groove 223 in which the piston rack 241 is movably accommodated is formed, and a pinion seating groove 224 in which the pinion gear 245 is rotatably accommodated is formed.

On a side surface of the mounting block 210, a driving portion supporting groove 215 into which the locking protrusion 242-1 of the driving portion 242 is inserted is formed, and a driving portion fastening groove for fastening with the driving portion bracket is formed.

Hereinafter, an operation of the vehicle seat 100 for mounting the child seat according to the exemplary embodiment of the present disclosure as described above will be described in detail with reference to the accompanying drawings.

Figure 10:
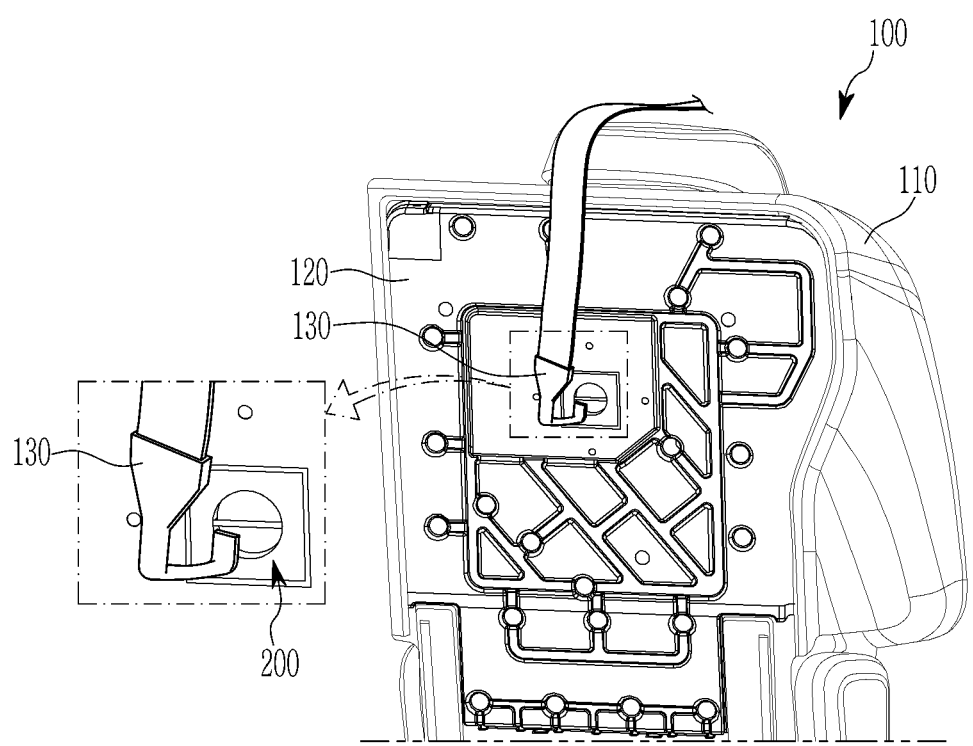
FIG. 10 illustrates a state in which a vehicle seat according to various exemplary embodiments of the present disclosure faces the front of a vehicle.
Figure 11:
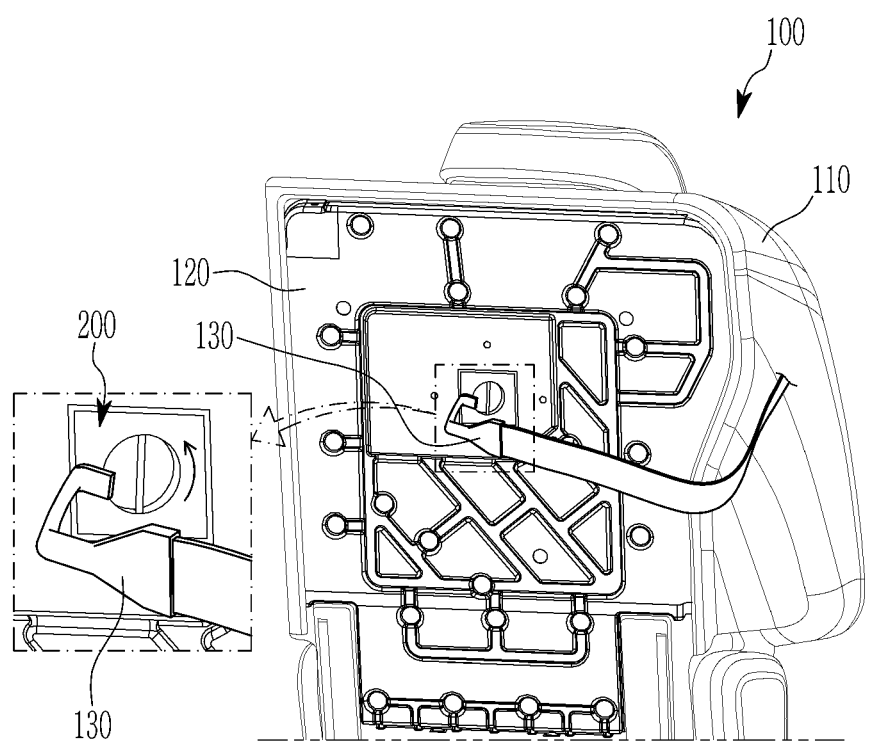
FIG. 11 illustrates a state in which a side of a vehicle seat according to various exemplary embodiments of the present disclosure faces the front of a vehicle.

FIG. 10 illustrates a state in which a vehicle seat according to various exemplary embodiments of the present disclosure faces the front of a vehicle. FIG. 11 illustrates a state in which a side of a vehicle seat according to various exemplary embodiments of the present disclosure faces the front of a vehicle.

Referring to FIG. 10, it shows a state in which the vehicle seat 100 does not rotate, and in other words, it shows a case in which the backrest frame 110 faces the front of the vehicle.

In the instant case, the rotation anchorage 200 provided in the seat back panel 120 does not rotate. Accordingly, the passenger may mount the child seat on the vehicle seat 100 by fastening the top tether 130 formed at the end portion of the belt of the child seat to the anchor member 221 of the rotation anchorage 200.

Referring to FIG. 11, it shows a state in which the vehicle seat 100 is rotated 90 degrees with respect to the driving direction, and in other words, it shows a case in which the side surface of the vehicle seat 100 faces the front of the vehicle.

In the instant case, the rotation anchorage 200 provided in the seat back panel 120 rotates by 90 degrees. Accordingly, the passenger may mount the child seat on the vehicle seat 100 by fastening the top tether 130 formed at the end portion of the belt of the child seat to the anchor member 221 of the rotation anchorage 200 rotated by 90 degrees. As described above, as the vehicle seat 100 rotates, the rotation anchorage 200 rotates, so that when the top tether 130 of the child seat is fastened to the anchor member 221 of the rotation anchorage 200, it is possible to prevent the belt of the child seat from twisting. Furthermore, the child seat may be stably provided on the vehicle seat 100, minimizing an injury of a child when a vehicle accident occurs.

Hereinafter, an operation of the rotation anchorage 200 according to the exemplary embodiment of the present disclosure will be described in detail with reference to the accompanying drawings.

FIG. 12A, FIG. 12B, FIG. 13A, FIG. 13B, FIG. 14A, FIG. 14B, FIG. 15A, FIG. 15B, FIG. 16A, and FIG. 16B are drawings for explaining an operation of a rotation anchorage according to various exemplary embodiments of the present disclosure.

Figure 12A:
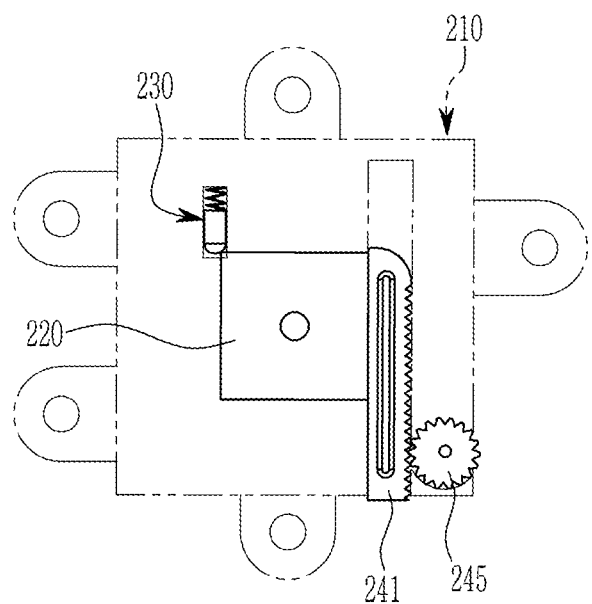
FIG. 12A, FIG. 12B, FIG. 13A, FIG. 13B, FIG. 14A, FIG. 14B, FIG. 15A, FIG. 15B, FIG. 16A, and FIG. 16B are drawings for explaining an operation of a rotation anchorage according to various exemplary embodiments of the present disclosure.
Figure 12B:
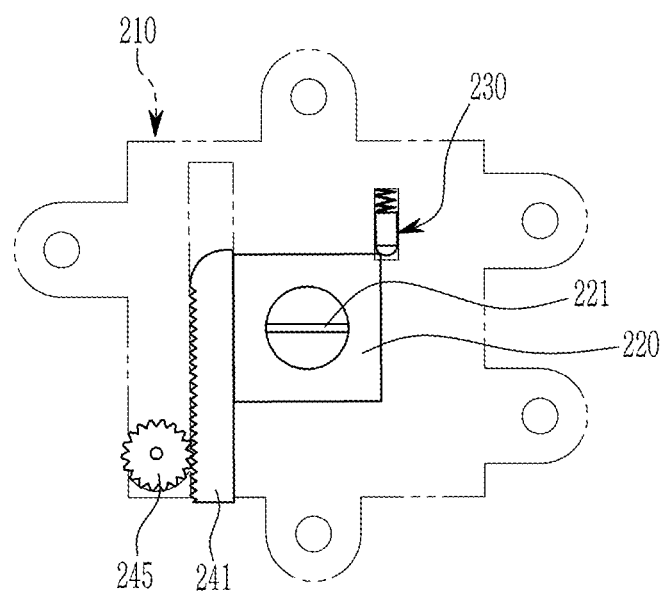
Figure 13A:
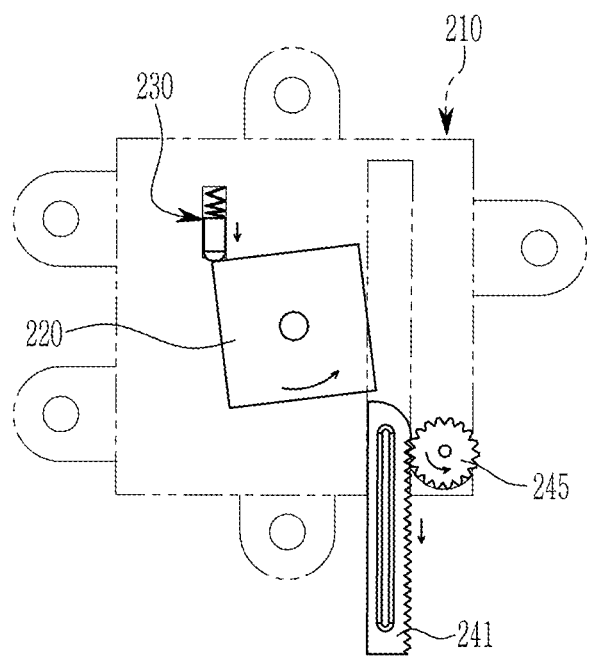
Figure 13B:
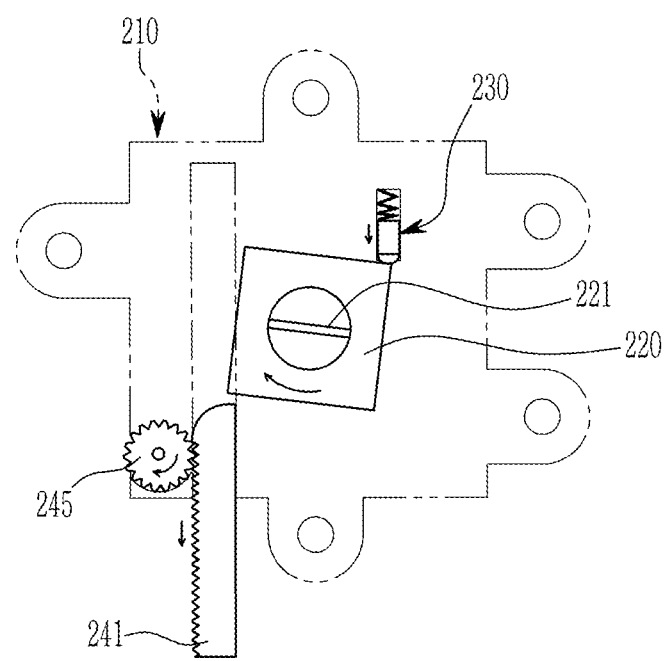

FIG. 12A and FIG. 12B illustrate an initial state in which the rotation anchorage 200 does not rotate. FIG. 13A and FIG. 13B illustrate a state in which the piston rack 241 of the piston device 240 moves in a downward direction thereof to not support the side surface of the rotating block 220. FIG. 14A, FIG. 14B, FIG. 15A, and FIG. 15B, illustrate a state in which the piston rack 241 of the piston device 240 moves in an upward direction thereof to rotate the rotating block 220. FIG. 15A and FIG. 15B illustrate a state in which the piston rack 241 of the piston device 240 moves to a final position and the rotation of the rotating block 220 is finished. FIG. 12A, FIG. 12B, FIG. 13A, FIG. 13B, FIG. 14A, FIG. 14B, FIG. 15A, FIG. 15B, FIG. 16A, and FIG. 16B illustrate a front end portion and a rear end portion of rotation anchorage 200, respectively.

Referring to FIG. 12A and FIG. 12B, when the rotation anchorage 200 does not rotate, the piston rack 241 of the piston device 240 supports the side surface of the rotating block 220. Accordingly, the rotating block 220 does not rotate.

Referring to FIG. 13A and FIG. 13B, when the power generated by the driving portion 242 is transmitted to the piston rack 241 through the power transmitting device, the piston rack 241 moves up to an unlocked position (for example, a position where the piston rack 241 deviates from the side surface of the rotating block 220) in an unlocked direction (for example, a downward direction thereof) to not support the side surface of the rotating block 220. In the instant case, because the elastic member 231 of the tensioner 230 provides an elastic force to a corner or side of the rotating block 220 through the head 233, the rotating block 220 is finely rotated by a predetermined angle in a counterclockwise direction thereof. In other words, when the piston rack 241 moves to the unlocked completion position in the unlocked direction, the rotating block 220 rotates by a predetermined angle by the tensioner 230.

In the instant case, the unlocked completion position of the piston rack 241 may be determined by the limiting device. That is, as the stopper pin 281 formed in the block cover 280 comes into contact with the end portion of the slit 241-1 formed in the piston rack 241, the piston rack 241 is not able to move, thus the unlocked completion position of the piston rack 241 may be determined.

Figure 14A:
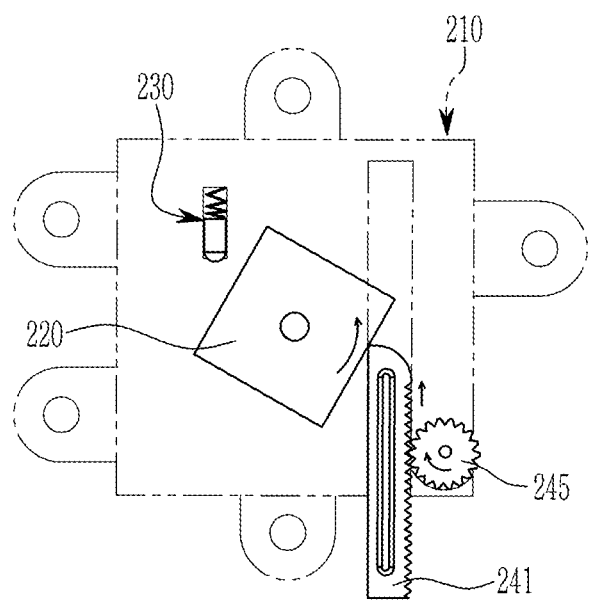
Figure 14B:
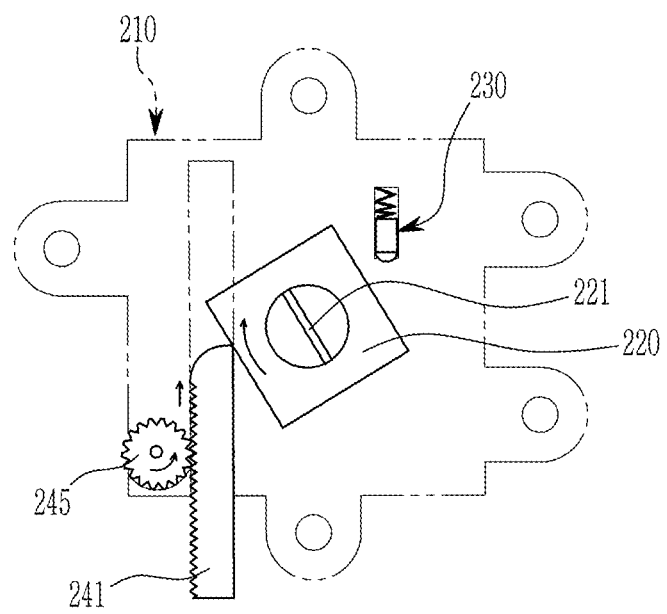
Figure 15A:
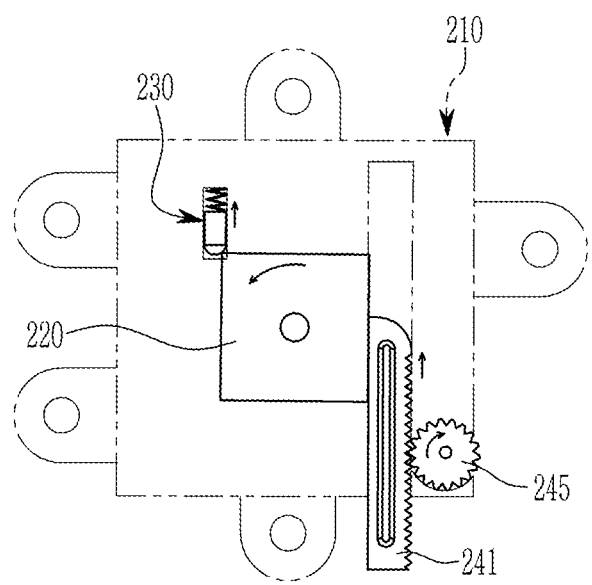
Figure 15B:
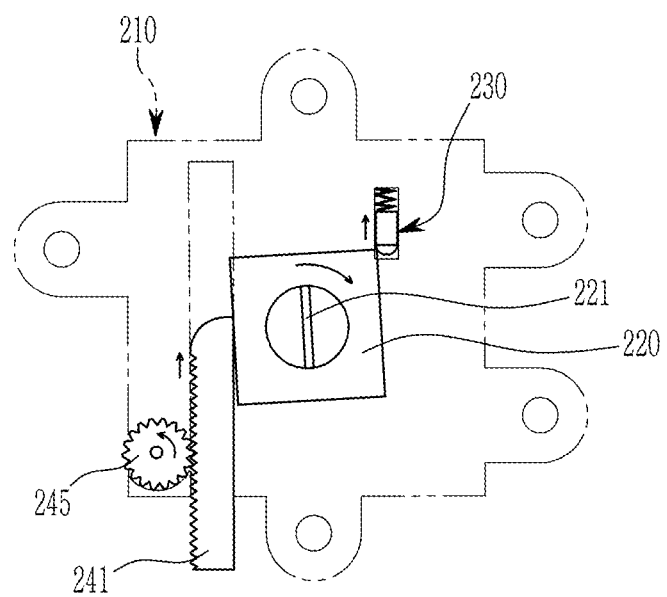

Referring to FIG. 14A and FIG. 14B, when the power generated by the driving portion 242 at the position where the piston rack 241 is unlocked is transmitted to the piston rack 241 through the power transmitting device, the piston rack 241 moves in an upward direction thereof, and the end portion of the piston rack 241 pushes a corner of the rotation block 220. Accordingly, the rotating block 220 is rotated counterclockwise.

In other words, when the piston rack 241 moves in the locked direction from the unlocked completion position by the power of the driving portion 242, the rotation block 220 rotates counterclockwise by the piston rack 241.

Referring to FIG. 15A and FIG. 15B, while the piston rack 241 continuously moves in the upward direction thereof, the rotating block 220 continuously rotates counterclockwise by the movement of the piston rack 241. Furthermore, while the corner of the rotating block 220 and the head 233 of the tensioner 230 come into contact with each other, the corner of the rotating block 220 pushes the head 233 of the tensioner 230 upwards.

Figure 16A:
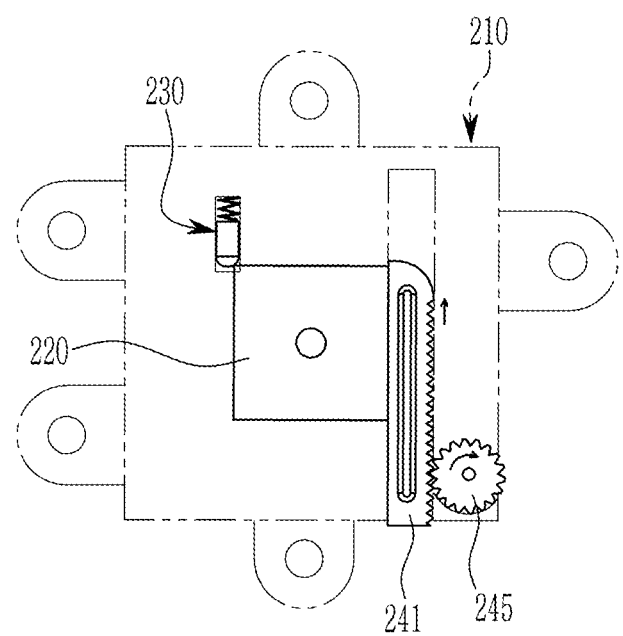
Figure 16B:
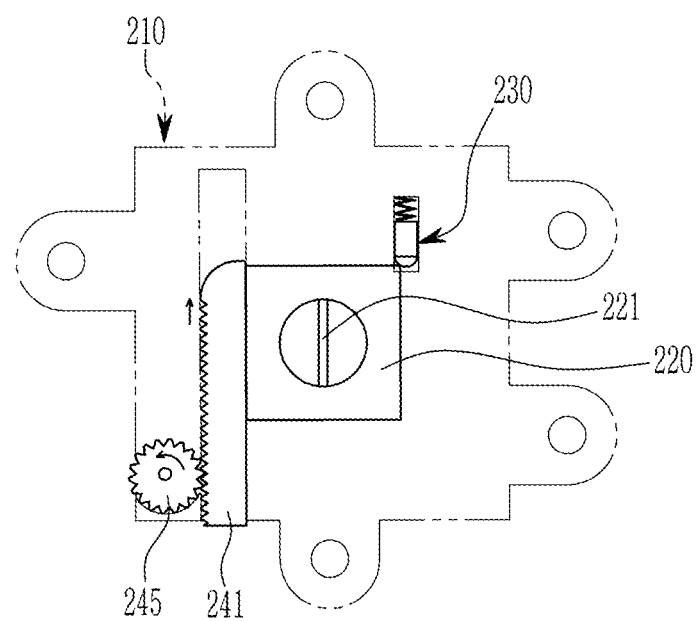

Referring to FIG. 16A, and FIG. 16B, when the piston rack 241 moves up to the final position, the operation of the driving portion 242 is stopped, and the rotating block 220 maintains a state rotated by 90 degrees from the initial state. In the instant case, the piston rack 241 supports the side surface of the rotating block 220 to prevent the rotating block 220 from rotating.

According to the exemplary embodiment of the present disclosure as described above, when the vehicle seat 100 rotates according to the driving direction of the vehicle, the rotation anchorage 200 for mounting the child seat rotates, and it is possible to prevent the belt of the child seat from being twisted, stably installing the child seat on the vehicle seat 100.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle seat for mounting a child seat which is rotatably provided in a vehicle body, the vehicle seat comprising:
a backrest frame;
a seat back panel coupled to the backrest frame; and a rotation anchorage which is provided in the seat back panel and is rotatably provided with an anchorage member to which a top tether of the child seat is fastened as the vehicle seat rotates,
wherein the rotation anchorage includes:
a mounting block mounted on the seat back panel;
a rotating block which is rotatably provided on the mounting block and in which the anchorage member to which the top tether of the child seat is coupled is formed;
a tensioner that provides an elastic force to the rotating block; and
a piston device supporting the rotating block so that the rotating block is selectively rotated.

2. The vehicle seat of claim 1, wherein the tensioner includes an elastic member provided in the mounting block and providing an elastic force for rotation of the rotating block.

3. The vehicle seat of claim 2, wherein the tensioner further includes a head coupled to the elastic member and selectively contacting with the rotating block.

4. The vehicle seat of claim 3, wherein an end portion of the head is formed to have a hemisphere shape.

5. The vehicle seat of claim 1, wherein the piston device includes:
a piston rack which is movably provided in the mounting block in a predetermined direction, selectively supports a side surface of the rotation block, and is configured to reciprocate within a predetermined length;
a driving portion that is engaged to the piston rack and configured to provide power to move the piston rack within the predetermined length; and
a power transmitting device that couples the driving portion to the piston rack and transmits the power of the driving portion to the piston rack.

6. The vehicle seat of claim 5, wherein the power transmitting device includes:
a worm gear connected to the driving portion;
a pinion gear gear-engaged to the worm gear; and
a rack gear formed in the piston rack and gear-engaged to the pinion gear.

7. The vehicle seat of claim 6,
wherein a block seating groove in which the rotating block is rotatably accommodated and a tensioner seating groove in which the tensioner is movably accommodated are formed on a first surface of the mounting block, and
wherein a rack seating groove in which the piston rack is movably accommodated and a pinion seating groove in which the worm gear is rotatably accommodated are formed on a second surface of the mounting block.

8. The vehicle seat of claim 6, wherein a driving portion supporting groove into which a locking protrusion of the driving portion is inserted is formed on a side surface of the mounting block.

9. The vehicle seat of claim 5, further including:
a block cover fastened to the mounting block to prevent the piston device and the tensioner from being separated from the mounting block.

10. The vehicle seat of claim 5, further including:
a limiting device that limits a moving distance of the piston rack.

11. The vehicle seat of claim 10, wherein the limiting device includes:
a slit formed in the piston rack; and
a stopper pin formed in the block cover and slidably inserted into the slit.

12. The vehicle seat of claim 11, wherein the slit is formed along a moving direction of the piston rack.

13. The vehicle seat of claim 5, wherein the piston rack is provided in the mounting block to be movable in an unlocked direction to allow rotation of the rotating block and in a locked direction to limit rotation of the rotating block.

14. The vehicle seat of claim 13, wherein
when the piston rack moves up to an unlocked completion position in the unlocked direction, the rotating block rotates in a first direction by the tensioner, and
when the piston rack moves in the locked direction at the unlocked completion position, the rotating block rotates in a second direction by the piston rack.

15. The vehicle seat of claim 1, wherein the rotating block is formed to have a polygonal block, and rotates at intervals of 90 degrees according to reciprocating movement of the piston rack.

* * * * *